Patented Feb. 20, 1934

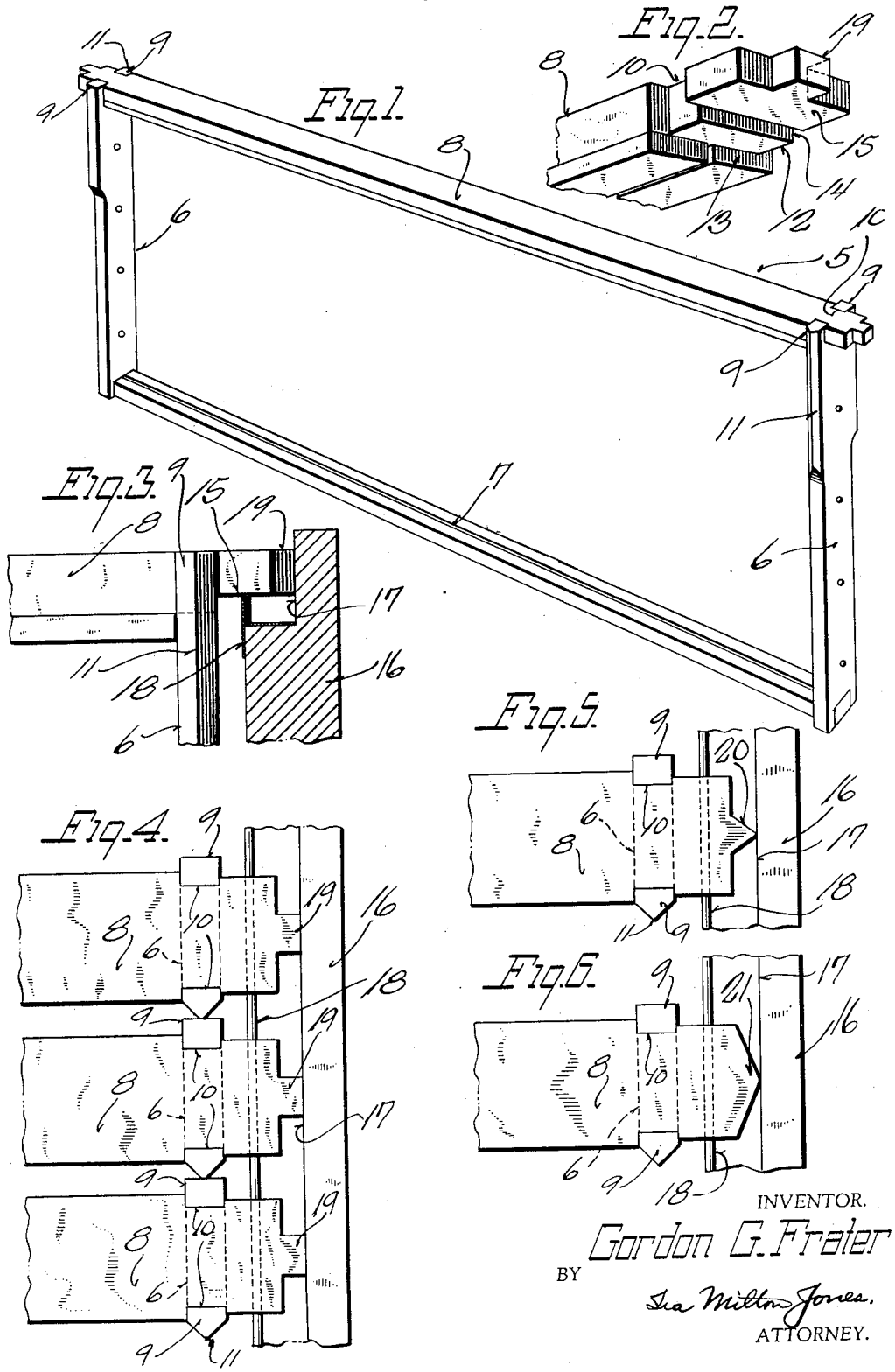

1,947,706

UNITED STATES PATENT OFFICE 1,947,706

HIVE FRAME

Gordon G. Frater, Watertown, Wis., assignor to G. B. Lewis Company, Watertown, Wis., a corporation of Wisconsin Application May 20, 1932. Serial No. 612,472

1 Claim. (Cl. 6—10)

This invention relates to improvements in frames for honey combs, and has as a general object to provide improved means for holding the frames against endwise shifting within the hive body or super.

It is essential to maintain the frames which support the honey combs properly spaced with respect to each other and also to hold the frames against endwise shifting in the hive. Sidewise spacing of the frames is afforded by sidewise extensions on their end bars, which engage each other with a narrow edge contact. Because of this narrow edge-like contact between the frames relative endwise shifting of the frames is especially undesirable, for if permitted, the necessary space between the frames closes and often crushes the bees.

Heretofore the frames have been held against longitudinal or endwise shifting, by driving a staple into, or applying some other attachment, to the end bars to engage the adjacent portion of the hive ends. Both of these methods of holding the frame against endwise shifting are objectionable.

The necessity for driving staples into the ends of the frame or of applying other attachments which have been proposed as spacing means, is undesirable for the reason that the frames are sold to the bee keeper in knock-down form and must be assembled by him.

With the other method of holding the frames against endwise shifting, that is, by extending the top bar ends for engagement with the hive walls, no bee space was left between the ends of the frame and the adjacent walls of the hive. As a result, the bees propolized the slight clearance between the ends of the frame and the end walls of the hive so that it was extremely difficult to remove the frame.

With these and other objections to existing frame constructions in mind, this invention contemplates novel means for holding the frames against endwise shifting in the hive or support, which means obviates the necessity for staples or other attachments and also affords a substantial bee space at the ends of the frame to prevent the bees from propolizing the frame ends to the adjacent hive walls.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claim.

In the accompanying drawing, several complete examples of the physical embodiment of this invention are illustrated constructed according to the best modes so far devised for the practical application of the principles thereof, and in which:

Figure 1 is a perspective view of a frame embodying this invention;

Figure 2 is a perspective view of one end of the top bar shown separated from the end bars of the frame;

Figure 3 is a detail view illustrating one end portion of the frame in its relative position to the end wall of the hive or super;

Figure 4 is a top view of one end portion of a number of frames and the adjacent wall of the hive or super; and Figures 5 and 6 are top views of frame ends illustrating slightly modified forms of this invention.

Referring now more particularly to the accompanying drawing, the numeral 5 represents a rectangular honey comb frame which consists of a pair of end bars 6, a slotted bottom bar 7, and a top bar 8. The slotted bottom bar is secured to the lower ends of the end bars 6 and the upper ends of the end bars are bifurcated and have their spaced projections 9 received in opposed notches or recesses 10 formed in the opposite sides of the top bar 8.

As is customary, the upper portions of the side members are of greater width than the lower portions and one edge of the wide upper portions is beveled as at 11 so that only a narrow edge-like contact exists between the adjacent frames. To increase the rigidity of the frame and facilitate its assembly, the ends of the top bar have their lower portions cut away or stepped to afford overhanging ends, as best illustrated in Figure 2.

The innermost steps 12 of the overhanging ends are of the same depth as the width of the slots or recesses 10 so that the inner wall of each end bar lies directly against the shoulder 13 at the inner end of each step and the outer surface thereof is flush with the shoulder 14 forming the riser between the inner step 12 and the outer step 15. Consequently the entire outer step portions 15 project beyond the end bars and afford means for suspending the frame in the hive or super.

The manner in which the frame is supported is clearly shown in Figures 3 and 4. As here shown, the end walls 16 of the hive or super have rabbets 17 at their upper inner edges, with metal supporting ribs 18 attached thereto to afford an edge-like support for the frame.

As hereinbefore brought out, it has been customary in the past to space the frames endwise in the hive or hold the same against endwise shifting, either by driving staples or applying some other attachment to the end bars 6 beneath the overhanging ends of the top bar for engagement with the inner wall of the hive ends, or by extending the overhanging ends of the top bars throughout their full width sufficiently to engage the vertical walls of the rabbets 17.

The objections to these past methods of securing the frames against endwise shifting has been noted and this invention entirely overcomes these disadvantages by merely providing the overhanging or projecting ends of the top bars with a narrow tit or extension 19.

The extreme ends of the tits or extensions 19 engage the vertical wall of the rabbet 17 as illustrated in Figures 3 and 4, and the tits or extensions are of sufficient length as to afford substantial space between the hive wall and the remaining portion of the top bar ends to permit the bees to pass therethrough. Consequently, the frame ends are stuck to the hive only at a relatively small portion so that removal of the frames is greatly facilitated.

Obviously, the particular shape of the tits or extensions 19 may vary, and in Figures 5 and 6, the tit is shown respectively, as a small narrow V shaped projection 20, and a flatter V shaped extension 21.

In each instance, a substantial bee space is afforded at the ends of the frame top bar while at the same time the proper spacing is maintained.

From the foregoing description taken in connection with the accompanying drawing, it will be readily apparent to those skilled in the art to which an invention of this character appertains, that this invention provides improved means for spacing the frames from the end walls of the hive, and it is also readily apparent that when it is necessary to shift the frames laterally in the hive to enable the removal of any particular frame or frames, the small contact between the end of the frame and the hive wall facilitates such sidewise shifting as the narrow width of the tit does not jam, a disadvantage inherent in the past frame structures in which the full width of the top bar extended to engage the hive end.

What I claim as my invention is:

In a frame for honey combs adapted to be received in a hive, said frame including a top bar having notches in its opposite sides adjacent its ends, end bars bifurcated at their upper extremities to engage the notches in the top bar, overhanging end portions on the top bar projecting beyond the end bars to rest on supports carried by opposite walls of the hive to suspend the frame in the hive with its end bars spaced from said walls of the hive, the ends of said overhanging end portions having parallel sides slightly inward of the planes of the sides of the top bar and terminating short of the adjacent portions of said hive walls to afford bee space, and tits projecting from the overhanging end portions to engage said hive walls and hold the frame against endwise shifting, said tits engaging the hive walls with a narrow contact and being of such size as to obstruct but a small portion of the bee space at the ends of the overhanging portions.

GORDON G. FRATER.